UNITED STATES PATENT OFFICE.

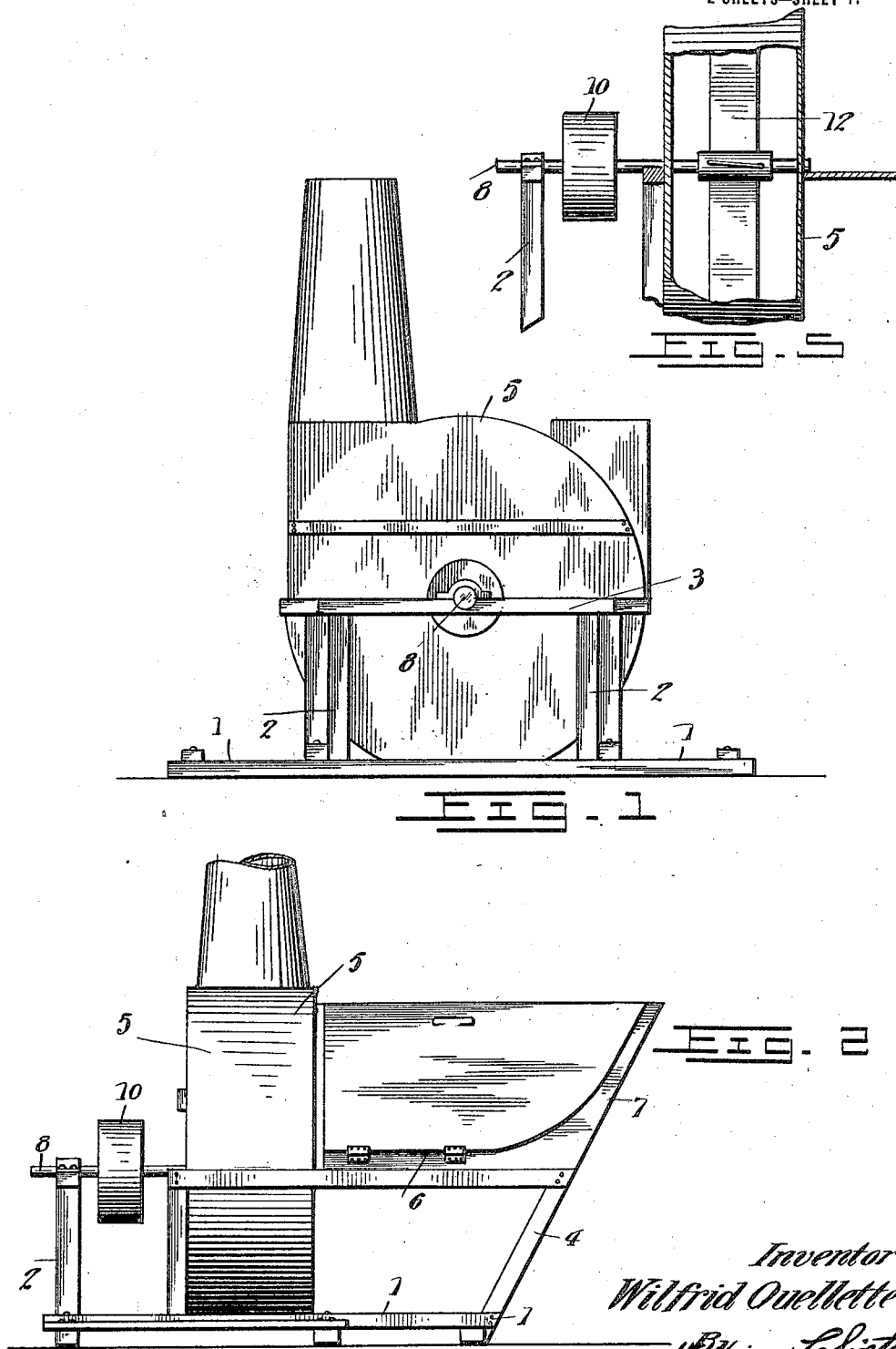

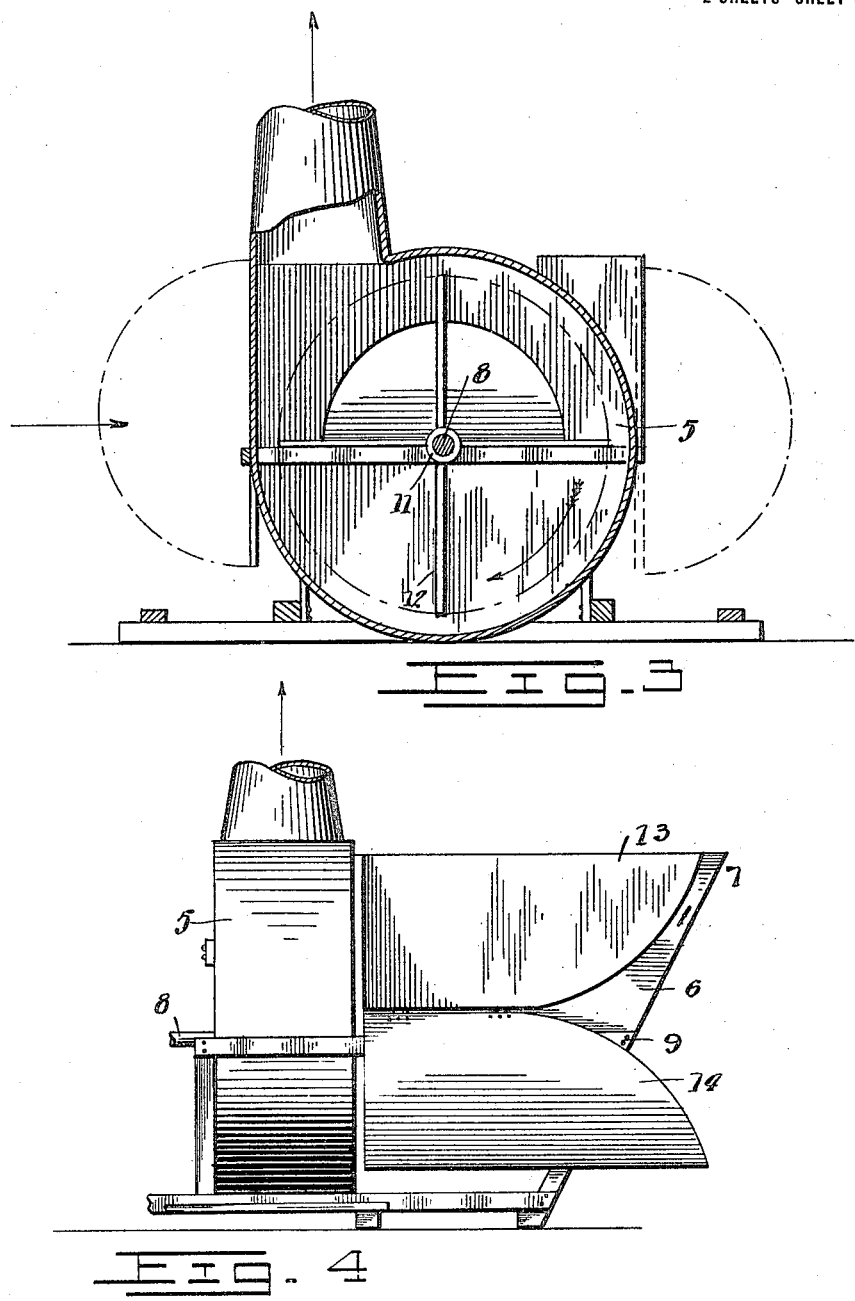

WILFRID OUELLETTE, OF ST. SCHOLASTIQUE, QUEBEC, CANADA.

BLOWER FOR THRESHING-MACHINES AND THE LIKE.

1,383,967.  Specification of Letters Patent.  Patented July 5, 1921.

Application filed December 6, 1919. Serial No. 343,034.

*To all whom it may concern:*

Be it known that I, WILFRID OUELLETTE, a subject of the King of Great Britain, residing at St. Scholastique, Province of Quebec, Canada, have invented certain new and useful Improvements in Blowers for Threshing-Machines and the like; and I do hereby declare that the following is a full, clear, and exact description of the invention, such as will enable others skilled in the art to which it appertains to make and use the same.

The present invention has relation to blowers for threshing machines and the like, and the principal object thereof resides in the provision of means for, in conjunction with the ordinary fanning attachment of a threshing machine, imparting a greater degree of separation of the straw and chaff from the grain.

Another object of the invention is to provide an attachment for threshing machines that both removes the straw and chaff and blows or stacks the same at a distance from the machine.

With the above and other objects in view which will hereinafter appear as the description continues, the invention consists of the novel features of construction, combination and formation of parts as will be hereinafter more fully described and particularly pointed out in the appended claim.

In the accompanying drawings has been shown a simple and preferred form of the invention, it being however, understood that no limitation is necessarily made to the precise structural details herein exhibited, but the right is hereby reserved to any changes, alterations or modifications to which recourse may be had that come within the scope of the claim without departing from the spirit of the invention or sacrificing the efficiency of the same.

In the accompanying drawings:

Figure 1 is a side elevation of the invention;

Fig. 2 is an end elevation of the same;

Fig. 3 is a vertical section;

Fig. 4 an opposite end elevation; and,

Fig. 5 is an elevation with parts in section of the wheel casing and drive shaft.

Referring more particularly to the accompanying drawings wherein like and corresponding parts are designated by similar reference characters throughout the several views:

The apparatus herein shown, comprises a base 1, vertical uprights 2, horizontal bars 3, and the angularly disposed bars 4. A drum or casing 5, preferably constructed of sheet iron, is supported upon said base by the aforesaid uprights and beams 2, 3 and 4, and said casing 5 is provided with an extension 6, the outer walls 7 of which form an entrance opening or chute for the introduction of straw or chaff from the regular blower of the threshing machine.

A shaft 8 has bearings in one of the bars 3 and the platform 9 of the casing and extends through the latter, carrying a pulley 10 and a blower wheel 11, comprising the blades 12.

The extension 6 is provided at its side portions with doors 13 and 14, which when opened allow for the passage of the straw and residue from the threshing machine to the auxiliary blower. Either of the doors may be opened at each side of the apparatus for connection with the outlet opening of the threshing machine and a suitable means may be provided for holding said doors against movement when adjusted.

In operation, the straw and residue from the threshing machine passes through one of the doors 13 or 14, and into the extension 6 and the same is sucked into the blower proper, by the blower wheel 11 and by the coöperation with the ordinary blower of the threshing machine, the straw is blown clear of the latter, to form a stack.

A belt may be trained around pulley 10 or the above recited mechanism can be directly connected to the threshing machine operating mechanism.

It is obvious that the straw and residue will be blown a further distance from the threshing machine, by the use of the present device, than has hitherto been accomplished with the ordinary machines.

Having thus fully described my invention, what I claim as new and desire to secure by Letters Patent is:

The combination in a device such as described, of a frame including upright and inclined bars, and horizontal bars connected thereto, an angular housing mounted in one side of the frame, a circular housing mounted in the opposite side of the frame, a shaft journaled in the circular housing, a fan carried by the said shaft, said circular housing having an outlet at its upper side, said housings having a communicating opening therebetween, and a closure secured to one side of the angular housing as and for the purposes set forth.

In witness whereof I have hereunto set my hand.

WILFRID OUELLETTE.

In presence of—
H. M. SAURI,
M. LACOMBE.